Patented Mar. 7, 1939

2,149,457

UNITED STATES PATENT OFFICE 2,149,457

THERAPEUTICALLY ACTIVE AMIDINES

Karl Miescher, Riehen, near Basel, and Ernst Urech, Basel, Switzerland, assignors to the firm Society of Chemical Industry in Basle, Basel, Switzerland No Drawing. Application June 15, 1936, Serial No. 85,434. In Switzerland June 21, 1935

8 Claims. (Cl. 260—2)

This invention relates to the manufacture of new therapeutically active amidines by converting a phenyloxy fatty acid nitrile, amide or thioamide, substituted in the phenyl nucleus, into a corresponding amidine.

For making the new compounds the phenyloxy fatty acid nitrile, substituted in the phenyl nucleus, is converted into its imido-ether and this is caused to react with ammonia or a primary or secondary amine. Alternatively, the nitrile may also be simply heated with a salt of one of these bases.

The same compounds are obtained by starting from an amide which may contain substituents at the nitrogen of the phenyloxy fatty acid substituted in the phenyl nucleus, converting this amide into its amido-chloride and causing the latter to react with ammonia or a primary or secondary amine. These bases may also be allowed to react with the thio-amide corresponding with the aforesaid amide in free or nascent condition.

The new compounds reduce the blood pressure considerably and possess moreover a powerful effect on the unstriated muscles, for example on the uterus. For this reason they are useful in therapeutics.

The following examples illustrate the invention the parts being by weight:—

Example 1

Hydrogen chloride is passed into a cooled mixture of equimolecular parts of alcohol and 2-methoxy-phenoxyacetonitrile (boiling point, under 2 millimeters pressure, 115–117° C., made, for example, by the reaction of chloracetonitrile with pyrocatecholmonomethylether in presence of an agent that binds acid) and the 2-methoxy-phenoxyacetimidoether-hydrochloride thus obtained is ground with an indifferent solvent, for instance, petroleum ether, ether or benzene, whereby the new compound is obtained in the form of a colourless crystalline powder sensitive to moisture. 24.5 parts of this hydrochloride are shaken with an alcoholic solution of 2.2 parts of ammonia until the ammonium chloride which is first produced has disappeared. The alcohol is then distilled and the residue recrystallized from acetone. The product thus obtained is a colourless crystalline powder, freely soluble in water and melting at 114–116° C.; it is 2-methoxy-phenoxyetheylamidine-hydrochloride of the formula

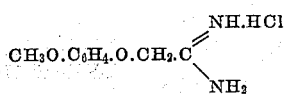

Instead of the hydrochloride of 2-methoxyphenoxyacetimidoether, another hydrogen halide, for instance hydrobromide, may be used.

Example 2

Hydrogen chloride is passed into a cooled mixture of equimolecular parts of alcohol and 2-methoxy - 6 - allyl - phenoxyacetonitrile (boiling point, under 1 millimeter pressure, 127–130° C., made, for example, by the action of chloroacetonitrile on 2-methoxy-6-allyl-phenol in the presence of an agent binding acid) and the product is ground as described in Example 1 with an indifferent solvent. There is obtained the 2-methoxy-6 - allyl - phenoxyacetimidoether-hydrochloride in the form of a colourless crystalline powder. 28.5 parts thereof are shaken with 2.2 parts of ammonia and 100 parts of alcohol. The solvent is then evaporated and the residue crystallized from a little acetone. The 2-methoxy-6-allyl-phenoxyethenylamidine-hydrochloride of the formula

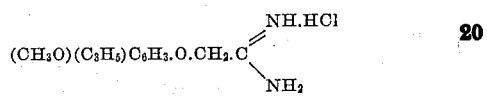

is a colourless crystalline powder of melting point 135–127° C. and is freely soluble in water.

Instead of the hydrochloride of the 2-methoxy-6-allyl-phenoxyacetimidoether, another salt, for instance the sulfate or methylsulfate or even the free base, may be used.

Example 3

2-ethoxy-phenoxyacetonitrile (boiling point, under 4 millimeters pressure, 125–127° C., melting point 44° C., made for instance from pyrocatechol-monoethylether and chloroacetonitrile in presence of an acid binding agent) is converted into the 2-ethoxy-phenoxyacetimidoether-hydrochloride as described in Example 1. 26 parts of this compound are shaken with an alcoholic or chloroformic solution of 9 parts of piperidine. After working up the product as described in Example 1 there is obtained 2-ethoxy-phenoxyethenylpiperidineamidine-hydrochloride of the formula

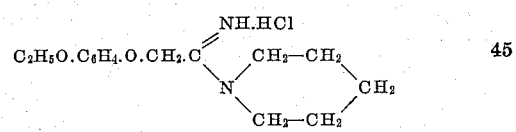

in the form of a colourless crystalline powder melting at 157° C. and freely soluble in water.

The reaction also occurs when the above-described nitrile reacts with a piperidine salt.

Example 4

By introducing hydrogen chloride into an alcoholic solution of quinoline-8-oxyacetonitrile (melting point 122° C., made by reaction of 8-oxyquinoline with chloracetonitrile) there is obtained quinoline - 8 - oxyacetimidoether - dihydrochloride. 30 parts of this body are shaken with an alcoholic solution of 4 parts of ammonia and the solution is then filtered and evaporated. There is thus obtained quinoline-8-oxyethylamidine-monohydrochloride of the formula

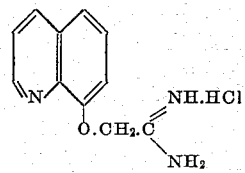

in the form of a colourless crystalline powder of melting point 204° C.

The same final product may be made by starting from quinoline-8-oxyacet-amide or -thioamide.

The reaction occurs in a similar manner when a naphthalene-oxyacetimidoether is used as the starting material.

*Example 5*

Quinoline-8-oxy-n-butyronitrile (melting point 66–67° C., obtained in manner analogous to that described in Example 4) is converted into the quinoline-8-oxy-n-butyrimidoether -dihydrochloride. 33 parts of this compound are shaken with an alcoholic solution of 4 parts of ammonia. When the reaction is complete the solvent is distilled and the residue recrystallized from a little water. The quinoline-8-oxy-n-butenylamidine-hydrochloride of the formula

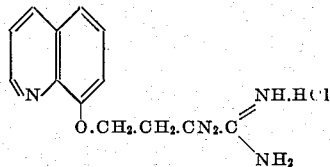

thus produced melts at 248° C.

Instead of quinoline-8-oxy-n-butyrimidoether, another quinoline-8-oxybutyrimidoether may be used, as for example the compound of the formula

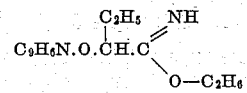

In like manner the products named in the following table may be made:— known may be made as indicated in Examples 1–5:

3-methoxy-phenoxyacetonitrile (boiling point under 4 mm. pressure 121–125° C.) from resorcin-monomethylether and chloracetonitrile.

4-methoxy-phenoxyacetonitrile (boiling point under 5 mm. pressure 142–145° C.) from hydroquinone-monomethylether and chloracetonitrile.

4-allyl-2-methoxy-phenoxyacetonitrile (boiling point under 2 mm. pressure 140–143° C.) from 4-allyl-2-methoxy-phenol and chloracetonitrile.

2-carbethoxy-phenoxyacetonitrile (boiling point under 5 mm. pressure 152–157° C.) from salicylic acid ethylester and chloracetonitrile.

Quinoline-6-oxyacetonitrile (melting point 108° C.) from 6-oxy-quinoline and chloracetonitrile.

What we claim is:—

1. Amidines of hydroxy fatty acid containing 2 to 4 carbon atoms, said amidines being substituted at the oxygen atom by a radical selected from the group consisting of quinoline, naphthalene and a substituted phenyl radical, the substituent of the latter being a member of the group consisting of alkoxy, carbalkoxy and an alkylene radical.

2. The methoxy-phenoxy-fatty acid amidines, the fatty acid chain of which contains 2 to 4 carbon atoms.

3. The methoxy-phenoxy-acetamidines.

4. 2-methoxy-phenoxy-acetamidine, forming a water soluble hydrochloride of melting point 114–116° C.

5. The quinoline-8-oxy fatty acid amidines, the fatty acid chain containing 2 to 4 carbon atoms.

6. The quinoline-8-oxy-acetamidines.

7. Quinoline-8-oxy-acetamidine, forming a water soluble hydrochloride with a melting point at 204° C.

8. The amidine of the following chemical structure:

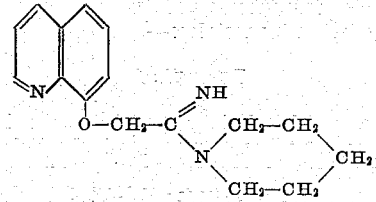

| | | M. P., °C. |
|---|---|---|
| 2-methoxy-phenoxy-ethenyl | -as-diethylamidine-hydrochloride | 134–136 |
| Do | -as-n-dibutylamidine-hydrochloride | 115–117 |
| Do | -as-diallylamidine hydrochloride | 138–139 |
| Do | -benzylamidine-hydrochloride | 133–135 |
| Do | -β,β,β-diethylphenyl-ethylamidine-hydrochloride | 180–182 |
| Do | -N-diethylaminoethyl-amidine-tartrate | 125 |
| Do | -phenylamidine-hydrochloride | 123–125 |
| 2-methoxy-phenoxy-butenyl | -amidine-hydrochloride | 116–118 |
| 2-methoxy-6-allyl-phenoxyethenyl | -as-diethylamidine-hydrochloride | 123–125 |
| Do | -piperidine-amidine-hydrochloride | 129–132 |
| 2-ethoxy-phenoxy-ethenyl | -amidine-hydrochloride | 117–119 |
| 2-carbethoxy-phenoxy-ethenyl | do | 146–148 |
| 3-methoxy-phenoxy-ethenyl | do | 135 |
| Do | -piperidine-amidine-hydrochloride | 141–143 |
| 4-methoxy-phenoxy-ethenyl | -amidine-hydrochloride | 120–122 |
| Do | -benzylamidine-hydrochloride | 108 |
| Do | -β-phenylethylamidine-hydrochloride | 189 |
| Do | -piperidine-amidine-hydrochloride | 168–170 |
| 4-allyl-2-methoxy-phenoxyethenyl | -amidine-hydrochloride | 93–95 |
| Do | -as-diethylamidine-hydrochloride | 121–123 |
| Do | -piperidine-amidine-hydrochloride | 152–154 |
| Quinoline-8-oxyethenyl | -piperidine-amidine-dihydrochloride | 208–210 |
| Do | -β-phenylethylamidine-monohydrochloride | 181–182 |
| Quinoline-6-oxyethenyl | -amidine-monohydrochloride | 249–250 |

The following parent materials not hitherto

KARL MIESCHER.
ERNST URECH.